United States Patent [19]
Buckalew

[11] Patent Number: 5,364,535
[45] Date of Patent: Nov. 15, 1994

[54] METHOD FOR SEPARATING OILY POLLUTANTS FROM WATER RUNOFF

[76] Inventor: Charles O. Buckalew, Unit 3A, 302 New Hampshire St., Hollywood, Fla. 33019

[21] Appl. No.: 848,236

[22] Filed: Mar. 9, 1992

[51] Int. Cl.⁵ .............................................. C02F 1/28
[52] U.S. Cl. ................... 210/671; 210/693; 210/747; 210/924
[58] Field of Search ............... 210/691, 693, 799, 170, 210/242.4, 924, 671, 747

[56] References Cited

U.S. PATENT DOCUMENTS

| | | | |
|---|---|---|---|
| 3,565,257 | 2/1971 | Cavalieri | 210/242.4 |
| 3,868,319 | 2/1975 | Black et al. | 210/169 |
| 4,052,306 | 10/1977 | Schwartz et al. | 210/DIG. 5 |
| 4,111,183 | 9/1978 | Haberthier | 126/270 |
| 4,130,489 | 12/1978 | Black | 210/242.4 |
| 4,197,204 | 4/1980 | Mathes | 210/DIG. 5 |
| 4,261,823 | 4/1981 | Gallagher et al. | 210/164 |
| 4,497,712 | 2/1985 | Cowling | 210/691 |
| 4,689,145 | 8/1987 | Mathews et al. | 210/170 |
| 4,737,394 | 4/1988 | Zafiroglu | 428/102 |
| 4,965,129 | 10/1990 | Bair et al. | 428/398 |

OTHER PUBLICATIONS

SPC Oil Sorbent Brochure.

*Primary Examiner*—Ivars Cintins
*Attorney, Agent, or Firm*—Lane, Aitken & McCann

[57] ABSTRACT

A pad for absorbing oily pollutants from water is releasably attached in a catch basin for floating on the surface of the water in the basin. When the pad is saturated with oily pollutants, it is removed and replaced by a new pad. A plurality of catch basins is connected in series and a pollutant-absorbing pad is releasably secured in each of the catch basins.

8 Claims, 2 Drawing Sheets

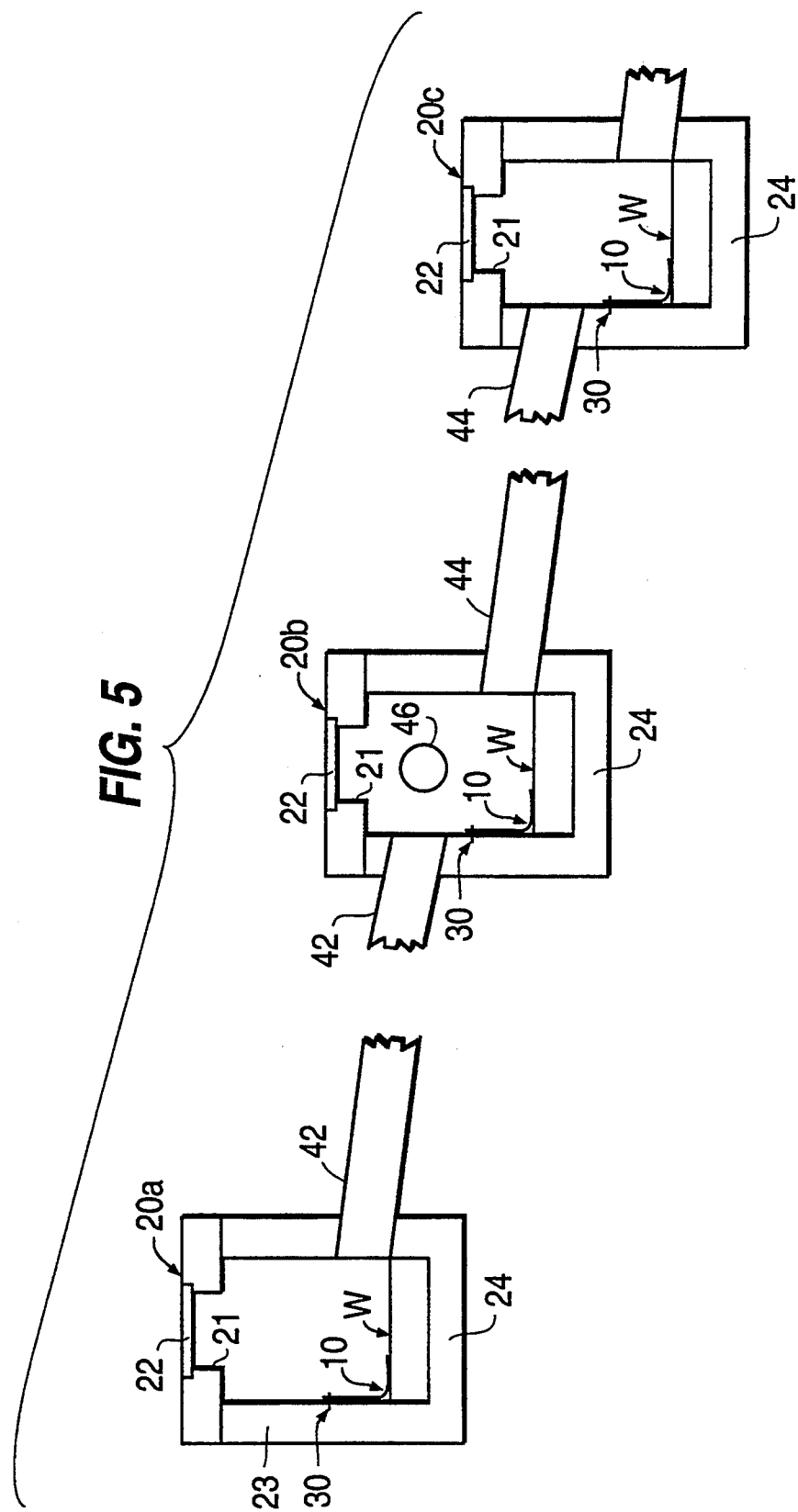

METHOD FOR SEPARATING OILY POLLUTANTS FROM WATER RUNOFF

BACKGROUND OF THE INVENTION

The present invention relates to an apparatus for and method of removing pollutants from water and, more particularly, for removing the oily pollutants from the runoff due to rain before the runoff can enter streams and bodies of water.

In recent years, federal, state and local regulatory agencies charged with storm water management have required that storm water be pre-treated, that is, cleaned up, prior to being discharged into the receiving body of water.

Sources of such pollution include light industrial areas where oils and organic solvents are used for equipment maintenance, and streets and parking lots where oil from automobiles and trucks has leaked from engine crankcases. Oil is also deliberately applied in some rural areas to reduce dust and control pests. Another source of undesirable oils and the materials which make up road surfaces themselves such as asphalt which can release tars. Rainstorms and other sources of water wash oil and organic material from paved surfaces towards gutters. Other undesired oils reach streams, lakes and oceans from water flowing over lawns, rooftops, parking lots and outdoor work areas. Rainwater washes the oils up and they float on the surface of the flowing water which travels to nearby storm drains, where it begins to travel to downstream creeks, rivers, bays and oceans. Pollutants of primary concern found in storm water include oils and other organic hydrocarbons. It is the first sheet of water which runs across a paved surface that contains the most pollutants and is important to be pre-treated.

Pretreatment in open areas can be accomplished by filtering the storm water through grass swales, exfiltration trenches (underground filtration), or dry retention areas. However, these pretreatment arrangements are often not possible due to, for example, lack of sufficient area or the high cost of acquiring it, in the case of grass swales, or a water table close to ground surface, in the case of exfiltration trenches. As a result, regulatory agencies are forced to allow direct discharge of storm water containing pollutants into ground water, canals, lakes, streams, etc. This oil pollution problem is exacerbated in urban and suburban areas where surface waters are quickly channelled into underground conduits. In these collection and channelling systems, oil is not exposed to sunlight and weather which tends to break down or evaporate the oils, especially the lighter fuel oils.

Spills of oil or other hydrocarbons from tankers and from equipment loading the tankers usually occur on large open waterways such as harbors, bays, canals, oceans, estuaries and, on some occasions, flowing rivers. Spills from these sources are routinely treated by first retaining the spill within a confined area with booms and then mechanically removing the oil with skimmers or absorbent materials. There are a number of absorbent materials for both natural and synthetic oils, including synthetic fibers which absorb oils but not water. However, these oil abatement measures are designed to be temporarily deployed at oil spill sites. These materials are designed to float on the surface of the water and soak up oil and other organics. They are then removed and disposed of or, in some cases, are squeezed out and reused on the spill.

Less attention has been focused on the contamination of streams and bodies of water by oils and other organics from what are known as non-point sources, such as in runoff from rainfall. Water in small streams, irrigation ditches, storm drains and gutters can become contaminated with oil from a variety of sources both acute and chronic in nature.

SUMMARY OF THE INVENTION

The instant invention is an improved storm drainage system that comprises a collection basin, or catch basin, with an oil absorbent pad retained within. The oil absorbent pad is made from synthetic fibers which float on the surface of the water. The pad is positioned and attached with a releasable fastener for ease of removal after the pad becomes saturated with oil. At that time, the saturated pad is removed from the releasable fastener and replaced with a new pad. The pad can be secured by attachment of the releasable fastener so that the pad is allowed to hang in a vertical direction. Since the pad floats, the pad correspondingly rises and the area of the pad in contact with the water increases as the level of water in the basin rises.

The pad comprises a mass of absorbent fibers covered on both sides by screening or netting and bound along the edges by a strong reinforcement material, such as canvas or nylon, to withstand the forces of rushing water. The screening or netting allows for the flow of oil and water into the absorbent fibers. One or more grommets are installed through the outer reinforcing material to further strengthen the pad where attachment to the releasable fastener takes place.

One specific embodiment of the device is an oil-absorbing pad of fibers in a planar, flat mat configuration covered by a reinforcing screen or net. The screening and binding supports the fibers in the desired configuration, retains the fibers, and allows liquid to freely pass into the fibers. Through the reinforcing material is a plurality of grommets which allow the pad structure to be retained to an anchoring structure by the connector. In one embodiment of the invention the pad is retained by a quickly releasable link. This configuration allows for the easy removal of pads that have been saturated with oil.

The pad is anchored on the side of the basin to allow limited movement of the pad. The pad is positioned so that a portion of the pad is in contact with the surface of the water. Since the pad floats when the water level increases, the pad rises with the water.

DETAILED DESCRIPTION OF THE PREFERRED EMBODIMENT

Figure 1:
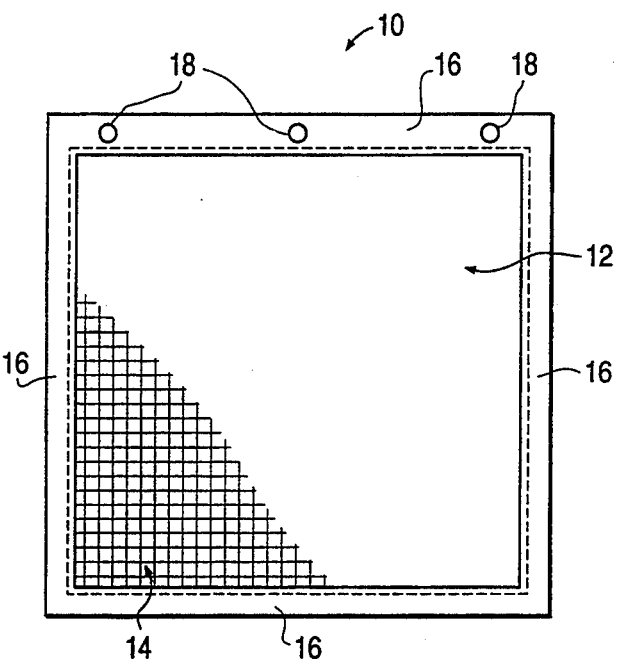
FIG. 1 is a front elevation of the oil absorbing pad according to the present invention.

As can be seen from FIG. 1, the oil absorbing pad according to the present invention, which is designated generally by the reference numeral 10, comprises a mass of non-woven fibers 12 of a material effective in absorbing oil and other hydrocarbons, while not substantially absorbing water. Polypropylene fibers have been found to be suitable and absorb 10-25 times their weight in oily pollutants. In addition to oil and gasoline, the polypropylene fibers are effective in absorbing the following pollutants from water: solvents, solvent based paints, vegetable oils, acetone cyanohydrin, acrolein, allyl chloride, amyl acetate, benzene, butyl acetate, butyric acid, cyclohexane, ethyl benzene, isoprene, methyl methacrylate, naphthalene, styrene, toluene, triethylamine, vinyl acetate and xylene.

In a preferred embodiment, the absorbing pad 10 is a pad of any size and shape, and the absorbent fibers 12 are covered with a screen 14 or net of a material having sufficient tensile strength to hold the absorbent fibers 12 together when the pad 10 is fully saturated with oil and subject to the force of a flowing stream of water. The screen 14 comprises filaments, spaced on the order of 14 filaments per inch, crossed with filaments having similar spacing to define an open mesh. Although metal is a suitable material for use as the screen 14, either fiberglass or plastic is preferred. Fiberglass and plastic are lighter materials which allow the pad to float on the surface of the water and are not subject to corrosion. A reinforcement material 16 is folded over the edges of the pad 10 and sewn or otherwise secured in place to cover the edges of the pad and to secure the screen 14 of the opposite sides of the pad. Canvas and nylon each have been found to be suitable for use as the reinforcement material 16. A further reinforcement device, such as a grommet 18, is attached to the pad 10, preferably at the reinforcement material 16 along the edge of the pad, to define a location for connection to a supporting and anchoring arrangement, and to withstand the greater forces associated with being a point of connection. Grommets of a strong, non-corrodible material, such as brass, copper or stainless steel have been found to be suitable. Preferably, a plurality of the grommets 18 are secured along one edge of the pad 10, so that the pad can be supported and anchored along that edge. Rather than being relatively thin, as illustrated, on the order of $\frac{3}{8}''$ to 3/16" thick, the pads 10 can have greater or less thickness, and can be more in the shape of a pillow, or still other shape.

Figure 2:
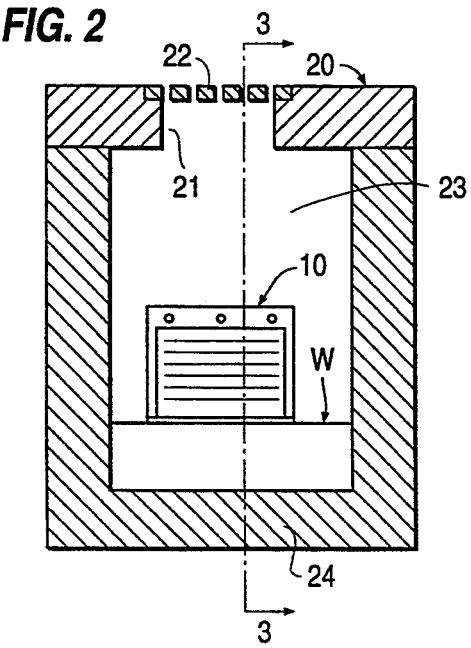
FIG. 2 is a schematic cross section of the pad of FIG. 1 in place in a catch basin.
Figure 3:
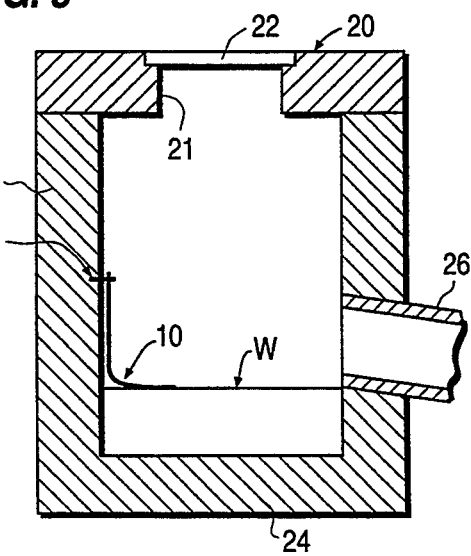
FIG. 3 is a cross section taken along the line 3—3 in FIG. 2.

As can be seen from FIGS. 2 and 3, the pad 10 is anchored in a catch basin 20 of a storm sewer system. The catch basin 20 is located in the ground, below the level of the surface of a street, parking lot, etc., and has an opening 21 at or near the top through which runoff from a rain storm or other precipitation can flow. The opening is typically located in a gutter, such as along the side of the road at a curb, and is covered by a grate 22. The catch basin 20 is typically made of precast concrete or bricks. Preferably, the pad 10 is anchored in the catch basin 20 in an arrangement which allows the pad 10 to float when the level W of water in the catch basin rises. In the arrangement illustrated, the pad 10 is secured in a vertical orientation by the connection of the grommets 18 along an edge of the pad 10 to a side wall 23 of the catch basin 20 by attachment devices 30. In addition to the side wall 23, the catch basin 20 has other side walls and a bottom 24 to define a chamber. The catch basin 20 typically retains some water in the bottom. The pad 10 is secured so that a portion of the pad contacts the water which is retained. As a result, even when there is a slight runoff of pollutant-carrying water into the catch basin 20, the pad 10 will be able to contact the pollutants, which float on the surface of the water, absorb them and hold them. As the level W of water in the catch basin 20 rises, an increasingly larger portion of the pad 10 contacts the surface of the water and floats. When the pad is relatively thin, as illustrated, the pad is sufficiently flexible that the portion of the pad above the level W of the water can be vertical while the portion of the pad floating on the water is horizontal. When polypropylene fibers are used in the 10 pad 10, the pad floats on the water even when it is fully saturated with pollutants. The pad 10 is also designed and installed so that it has a top end positioned at least as high as the level W of water in the catch basin 20 is expected to rise during all but the most severe rain storms. For example, the level of the upper end of the pad 10 can be chosen to be even with the level which water would reach in the catch basin as the result of a ten-year event, that is, a rain storm dropping so large an amount of water, that it is expected for a particular locality only once every ten years. A ten-year event is given only as an example; it may be desired to choose a level in the catch basin 20 which would be reached as a result of a storm producing so much rain that it occurs only once in a twenty-five-year period.

Figure 4:
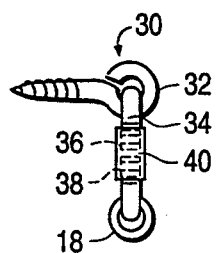
FIG. 4 is an illustration of a releasable connector for connecting the pad to the catch basin; and, FIG. 5 is a schematic illustration of a plurality of catch basins containing oil absorbent pads and being connected in series.

A specific attachment device 30 for anchoring the pad 10 can best be seen from FIG. 4, the attachment device having a screw eye 32 having threads which can engage an anchor positioned into the wall 23 of the catch basin 20 and a releasably connecting locking link 34 connected between the threaded screw eye 32 and a grommet 18 on the pad 10. The link 34 can be generally C-shaped with the ends 36, 38 of the link at the opening in the "C" being threaded, and an internally threaded sleeve 40 threadedly engaging the threads on one end 36 of the link and being rotatable to extend to and engage the threads on the other end 38 of the link as well, thereby closing and locking the link. By rotation of the sleeve 40 in the opposite direction, the link 34 can be opened and removed from the grommet 18 and the screw eye 32. A C-shaped link such as that described is commercially available under the tradename LINK QUICK. Although a specific anchoring arrangement for the pad 10 has been described, it is understood that other arrangements are suitable which securely anchor the pad 10 in the catch basin 20 and allow the pad to float on the surface of the water and contact the water surface throughout the range of levels attained by the water surface in the catch basin.

When rain falls, it runs off of a road or other surface and carries oil and oil-based pollutants into the gutters and into the opening 21 at the top of the catch basin 20. As the water falls into the standing water in the catch basin 20, the oil and oil-like materials stay on the upper surface of the water, where they are absorbed by the pad 10, which floats on the surface of the water. The pad 10 does not absorb water, but only the oily materials. By absorbing the oily products, the pad 10 prevents the oily pollutants from going through the storm drainage system and into ground water, creeks, and other streams and bodies of water. After time, the pads 10 will become saturated with the oily products. A periodic inspection of pads in catch basins detects the saturation.

When saturation occurs, the releasable fasteners 30 are released, and the saturated pad 10 removed and disposed and a fresh pad installed in its place.

In normal practice, a series of catch basins 20a, 20b and 20c, as shown in FIG. 5, is employed to catch the runoff from a road or other surface and conduct the runoff to an end point, such as a stream, settling pond, grass swale or other conventional point of disposal. For example, the catch basin 20a is connected to the catch basin 20b by a pipe 42. Similarly, the catch basin 20b is connected to a catch basin 20c by a pipe 44. Of course, even a greater number of catch basins can be, and are likely to be, connected in the series. Furthermore, other branches of series of catch basins can be connected to the first series. For example, a branch of catch basins, or a single other catch basin, can be connected to the catch basin 20b by the pipe 46, which enters through a side wall other than the side wall through which the pipe 42 enters. Any one of the catch basins 20a, 20b, or 20c can have a connection to other catch basins through each of its side walls. Not only does each catch basin receive water directly from the surface, through the openings 21, but it also receives water from upstream catch basins. A pad 10 according to the present invention is installed in each of the catch basins. As a result, any pollutants which might not be absorbed by a pad 10 in an upstream catch basin are again subject to being absorbed by a pad 10 in a downstream catch basin and in each catch basin in the series. Therefore, pollutant-laden water runoff flowing through a series of basins containing the pads 10 according to the present invention is cleaned up prior to disposal of the water into a natural stream or body of water by the absorption of the pollutants by the pads 10 according to the present invention.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

I claim:

1. A method for removing oily pollutants from storm water runoff from a street or parking area comprising:
   (a) receiving the storm water runoff in a basin of a storm sewer system;
   (b) attaching to the basin a member made of oily pollutant separating and retaining material, wherein the step of attaching comprises attaching the member of oily pollutant separating and retaining material such that said member floats on the surface of the water in the basin by securing a first end of an attaching device to the basin and by securing a second end of the attaching device to the member of oily pollutant separating and retaining material.

2. The method according to claim 1, wherein the step of attaching comprises releasably attaching the member of oily pollutant separating and retaining material to the basin.

3. The method according to claim 1, further comprising allowing the member of oily pollutant separating and retaining material to float as the level of the water in the basin changes.

4. The method according to claim 1, further comprising inspecting the basin after the installation of the member of oily pollutant separating and retaining material to determine when the member is sufficiently saturated with oily pollutants.

5. The method according to claim 4, further comprising removing the member of oily pollutant separating and retaining material in response to a detection that the member is sufficiently saturated, and replacing the sufficiently saturated member with another member of oily pollutant separating and retaining material.

6. The method according to claim 1, further comprising removing the member of oily pollutant separating and retaining material, removing the oily pollutants from the member, and reattaching the member to the basin.

7. The method according to claim 1, wherein said member of oily pollutant separating and retaining material comprises polypropylene material.

8. The method according to claim 1, wherein the member of oily pollutant separating and retaining material comprises polypropylene fibers.

* * * * *